UNITED STATES PATENT OFFICE.

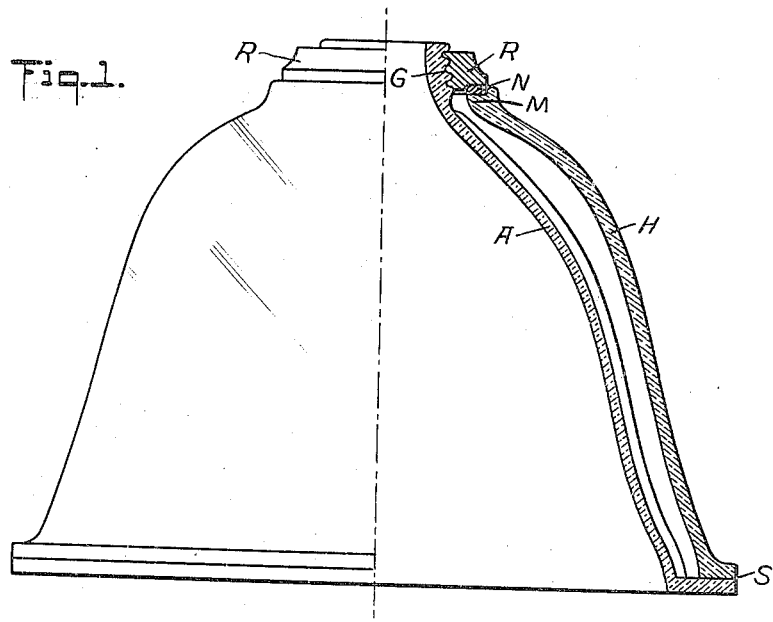
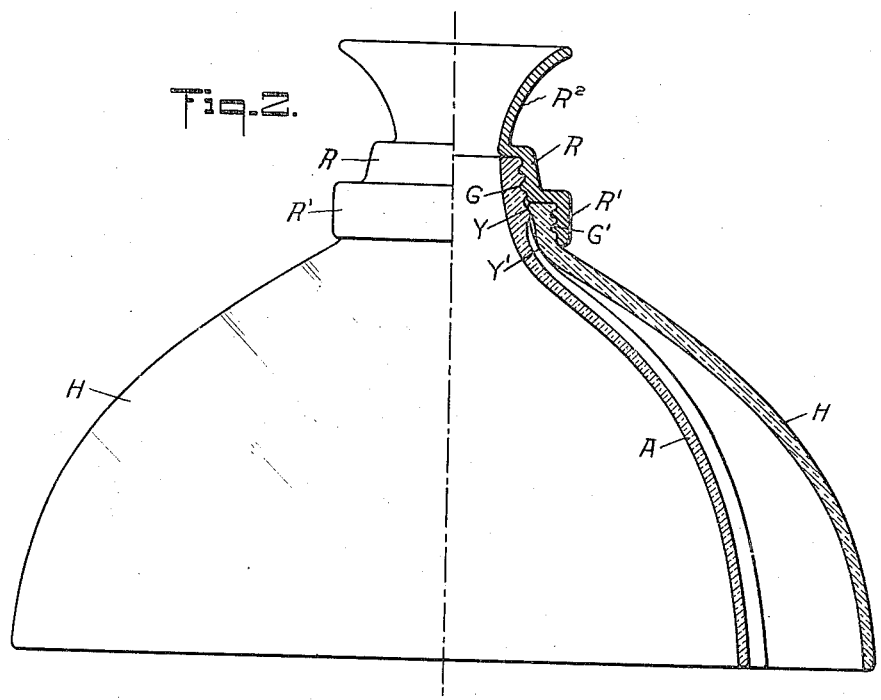

OTIS A. MYGATT, OF NEW YORK, N. Y., ASSIGNOR TO HOLOPHANE GLASS COMPANY, A CORPORATION OF NEW JERSEY.

ILLUMINATING APPLIANCE.

1,236,594.    Specification of Letters Patent.    Patented Aug. 14, 1917.

Application filed December 31, 1915.  Serial No. 69,674.

*To all whom it may concern:*

Be it known that I, OTIS A. MYGATT, a citizen of the United States, and a resident of the city and State of New York, have invented certain new and useful Improvements in Illuminating Appliances, of which the following is a specification.

The object of my invention is to produce a compound glass shade or reflector which by means of attachment becomes practically a one-piece article. Where prisms or ornamental forms or constructions are used on the surface of a shade or reflector for light distributing purposes, it is often useful to cover the prismatic shade with a second shade to protect the prisms from dirt or dust, to get better diffusion, or a combination of the two purposes.

The two shades have hitherto been held together by special holders having two holder parts or by cementing or melting the two glass articles together. This latter scheme, however, has the disadvantage that it does not allow for the contraction and expansion of the glass caused by heat generated by the source of illumination. In the case of special holders the two separate clamping devices permit dust to get between the inner and outer parts of the two glass shells and such devices are cumbersome and inconvenient. The arrangement described in my present invention not only prevents the dirt from penetrating between the two shades and avoids the cracking of either shade through expansion or contraction but permits the use of a single, simple holder arrangement.

My invention consists in making the collar of the inner shade with a screw thread, the outer shade being provided with a screw-threaded ring, which screws around the glass thread, in the manner hereinafter described, making a firm and practical arrangement, which can be made dust proof where desired. Rubber, asbestos, or other gasket rings can be the arrangement between the joints so as to allow for expansion and contraction, although this is not necessary if the device is not clamped together too closely.

Figure 1 is a vertical cross section of one form of my invention. Fig. 2 is a vertical cross section of a further modification thereof.

In Fig. 1, A is the inner glass shade with threaded screw collar G. The outer shade H rests upon the shoulder part S of the inner shell A; the metal screw threaded ring R screws down around the threaded glass collar G until it presses down upon and firmly holds the collar part N of the outer shell H. A rubber, asbestos, or other type of gasket N is placed between the metal ring and the glass collar, but may be placed between the two glass collars or at S between the two glass joints there. The metal screw threaded arrangement is shown as a simple ring, but the ring may be prolonged upward and made with a lip so as to fit a holder of any size, as shown in Fig. 2. The glass shades are shown in close contact at the top and bottom, which is preferable where a dust proof article is desired, but the lower or wider edges of the two glass shades are not necessarily in contact but may be separated from each other.

In Fig. 2 is shown a vertical cross section of a modification in which the outer shell H also has a glass thread G' upon its collar, in which case the metal ring R is made with two screw threaded portions upon it R' and $R^2$; one being of a larger diameter than the other. This arrangement is desirable where the two shades are not in contact at the lower or flared edges, and are intended for suspension from their narrow or collar portions. As illustrated in Fig. 1, this combination may be used with its larger diameter uppermost and its collar portion downward, or the reverse position may also be used. In Fig. 2, the lower thread $R^2$ is not absolutely necessary, even when the lower edges E and E' of the shades are not fastened together. It will be observed that the outer shell H rests upon the inner shell A by its collar or shoulder at Y and Y', so that if the metal ring part ends at X, the shoulder holds the collar part H firmly to the collar part of A. In Fig. 2, the metal ring is flared to $R^2$ in order to fit the usual holders.

Having described my invention, what I claim is:

1. An illuminating appliance composed of two glass shades, one inclosing and surrounding the other, the inner shade having an integral glass screw thread collar and a screw thread metal ring attached adapted to screw on to the glass collar to hold the inner shade to the outer shade.

2. In combination, a glass shade with an integral screw thread collar part, a second shade surrounding the same of similar construction and a screw thread ring screwing on to the threaded collars adapted to clamp and hold them together.

OTIS A. MYGATT.

Witnesses:
JOEL B. LIBERMAN,
JOSEPH DUNN.